Patented Jan. 12, 1943

2,308,236

UNITED STATES PATENT OFFICE 2,308,236

POLYMERIZATION OF POLYHYDRIC ALCOHOL ESTERS OF MONOCARBOXYLIC ACIDS

Maxwell A. Pollack, Irving E. Muskat, and Franklin Strain, Akron, Ohio, assignors to Pittsburgh Plate Glass Company, Allegheny County, Pa., a corporation of Pennsylvania No Drawing. Application February 18, 1939, Serial No. 257,132

6 Claims. (Cl. 260—80)

This invention relates to methods of producing novel resinous products and to the novel materials resulting from such methods. It has been previously noted that certain unsaturated esters of unsaturated acids such as glycol dimethacrylate polymerize to form insoluble, infusible products. Because of the insolubility and infusibility of these materials, however, they are exceedingly difficult to handle and have not been used extensively. Attempts to cast polymerize these materials have not been successful due to the great shrinkage which occurs during polymerization, producing fractures in the product.

In addition, we have found that some unsaturated esters of unsaturated acids polymerize very slowly to form soft resinous products which are not sufficiently hard for many purposes. Thus, while it has been known that certain of these materials polymerize, the materials have not been regarded as having sufficient desirable properties to warrant their use in commercial processes.

In accordance with our invention, we have devised a process by which the polyhydric polyesters of polymerizable unsaturated acids may be used to produce a wide variety of products having desirable characteristics. In polymerizing these materials which contain two or more polymerizable groups, such as ethylene glycol dimethacrylate, glycerol dicrotonate, glycerol tricrotonate, etc., we have determined that desirable products may be secured by polymerizing the material in two stages. We have found that upon polymerization of the polyester formed by esterification of a polyhydric alcohol with an unsaturated acid which is normally polymerizable, a fusible polymer is preliminarily formed. As polymerization proceeds in the usual manner, however, the polymer is converted into an infusible gel. Further polymerization of the gel may occur but it is often observed that products so produced are not satisfactory for future use.

By polymerization in two stages, we have been able to secure shaped products of great hardness and transparency. In accordance with this process, the polymerization of the material is interrupted before the polymer becomes infusible. The polymer so produced is then molded to the desired form and polymerization is continued until a suitable product is secured. In general, it is found desirable to interrupt polymerization when the monomer-polymer mixture is a viscous solution since attempts to polymerize to the point at which the mixture solidifies at polymerization temperature usually result in substantial gelation, thus making the product difficult or impossible to mold. In order to secure hardened products, it is often found necessary to remove all or a portion of the residual monomer in the polymer prior to or during continued polymerization. Methods of removing the monomer are hereinafter more fully discussed.

We have found that desirable results may be secured by polymerization of polyhydric alcohol polyesters of various unsaturated acids, such as the polyesters of acrylic and alpha-substituted acrylic acids, for example, resorcinol dimethacrylate, glycol dimethacrylate, glycol diacrylate, glycerol di- or tri- methacrylate or mixtures thereof, or polyglycol diacrylates, glycerol di- or triacrylate or the acrylic, methacrylic, or alpha-chloracrylic esters of the higher polyhydric alcohols, such as sorbitol or mannitol wherein at least two of the hydroxyl groups are esterified with the above named acids. Similarly, other polyesters of polyhydric alcohols and monobasic unsaturated acids, such as ethylene glycol dicinnamate, glycerol dicinnamate, glycerol tricinnamate, glycol dipropiolate, etc., glycol or glycerol di-isocrotonate, glycerol di-cinnamalacetate or the corresponding polyglycol esters or esters of the higher polyhydric alcohols, wherein at least two hydroxyl groups have been esterified with unsaturated acids such as propiolic, tetrolic, crotonic, cinnamic, vinyl acetic, ethyl acrylic or allyl acetic acids or the like or mixed esters of the above-mentioned acids, such as glycol monocrotonate-monoacrylate, glycerol dicrotonate monomethacrylate, etc.

Other glycol derivatives, such as the polyesters of 1,2-propylene glycol butylene glycol, or of the polyglycols of propylene or butylene glycol or the corresponding chlorhydrins which contain at least two hydroxyl groups such as glycerol alpha-chlorohydrin may be esterified with these unsaturated monocarboxylic aliphatic acids for the production of polymerizable esters in accordance with this invention. In order that a product of maximum surface hardness be produced, it is preferred to make use of compounds wherein the number of carbon atoms in the molecule of the monomeric form is not excessive. Thus, it is found that as the number of carbon atoms increases, the products tend to become more difficult to polymerize and to polymerize to softer product. The trend toward softer products as the number of carbon atoms is increased may be minimized by increasing the number of polymerizable double bonds in the composition. Thus, sorbitol hexamethacrylate polymerizes to form a product which exhibits great hardness. In general, it is preferred to make use of agents wherein the ratio of the number of carbon atoms in the molecule of monomer to the number of polymerizable unsaturated groups does not exceed 15 and preferably materials wherein this ratio does not exceed 8 are made use of. In addition, it is found that most desirable products are secured through use of materials containing not in excess of 10 carbon atoms in each of the alcohol radicles and in the acid radicles.

The method of securing the fusible polymer is dependent upon the nature of the material which is undergoing polymerization. In general, it is possible to secure the fusible material in substantial yields by polymerizing the monomer in a solution in which the fusible polymer is normally soluble. This polymer is generally soluble in the solvents which are capable of dissolving the usual thermoplastic vinylic type resins, such as methyl metracrylate. Thus, such solvents as acetone, dioxane, chloroform, toluene, benzene, carbon tetrachloride, methyl cellosolve acetate, phenyl cellosolve, dichlorethyl ether, xylene, tetralin, dibutyl phthalate, trichlorethylene, tetrachlorethane, etc., or mixtures of these solvents are found to be suitable.

In each case, the polymerization may be interrupted before the infusible product is produced. This may be accomplished by stopping polymerization as the mixture of monomer and polymer begins to grow viscous and before gel formation occurs. In accordance with one illustrative method of interrupting polymerization, the polymer may be separated from the monomer by convenient methods, for example, by the addition of a compound in which acrylate polymers are normally insoluble, such as methyl or ethyl alcohol, petroleum ether, water, ethylene glycol, etc. This process permits the isolation of the fusible polymer in a substantially pure state and is particularly adapted to use when the material is polymerized in solution. Polymerization may also be halted by lowering the temperature of the reaction mixture to a suitable degree, for example, to room temperature or below.

In accordance with another effective method of interrupting polymerization, inhibitors, such as pyrogallol, hydroquinone, aniline, phenylene diamine, sulphur, thiophenol, organic or inorganic salts or complexes of the reduced forms of metals such as copper, manganese, cobalt, nickel, etc., dipentene, etc., may be added to the polymer during polymerization or before polymerization has been initiated. When the fusible polymer is produced in solution, it may be recovered by methods other than by treatment with a nonsolvent, such as by slow evaporation or distillation of the solvent. Fusible cast thermoplastic polymers which may be machined, cut, bent or otherwise worked into desirable forms may be obtained in this manner. After final shaping, the products may be completely hardened and rendered infusible by suitable methods hereinafter more fully set forth.

In polymerizing in solutions, it has been found that the yield of fusible polymer appears to be dependent to a great extent upon the concentration of the monomer in the solution undergoing polymerization. When very concentrated solutions (40-50 percent by weight) containing a large quantity of an acrylate polyester of a polyhydric alcohol, such as glycol dimethacrylate, are subjected to conditions of polymerization, the amount of fusible polymer which may be secured prior to gel formation is very low, often not in excess of 5 percent by weight of the theoretical yield. Conversely, when solutions containing somewhat lower concentrations of monomer, for example, up to 30 percent by weight, yields of the fusible polymer upward of 75 percent of the theoretical may be secured. Accordingly, when dealing with unsaturated acrylates, it is preferred to treat solutions having a monomer concentration below 40 percent by weight.

The yield of fusible polymer appears to be increased by treating the solution at increased temperatures and increased catalyst concentrations. Thus, substantially greater yields may be secured by polymerizing ethylene glycol dimethacrylate solutions at 100° C., or above than may be secured at 60° C. Catalyst concentrations up to 5 percent or more may be used in some cases. In general, conditions favoring the formation of lower molecular weight polymers appear to result in increased yields of fusible products.

The following examples illustrate the preparation of these fusible polymers in solvents.

Example I

One part by weight of ethylene glycol dimethacrylate was heated with 0.07 part by weight of benzoyl peroxide and 5.6 parts by weight of acetone under a reflux condenser for one and one-half hours. The resulting solution was carefully poured, with stirring, into 100 parts of methanol. A white precipitate which was fusible and soluble in acetone was formed. When heated under slight pressure at 90° C. this material fused and rapidly converted to an insoluble and infusible forms.

Example II 55 parts by weight of ethylene glycol dichloracrylate were heated with 3 parts by weight of benzoyl peroxide and 350 parts by weight of acetone at a temperature of 60° C. for one hour. At this time, 300 parts of methanol were added to produce turbidity and the resulting mixture was poured slowly, with stirring, into 1600 parts of methanol. The white voluminous precipitate thus formed was filtered and dried, and was soluble in acetone and chloroform. Upon heating, the polymer softened at 100° C. and rapidly converted into an infusible, insoluble, transparent material.

Example III 55 parts by weight of glycerol triacrylate were heated with 3 parts by weight of benzoyl peroxide and 350 parts by weight of acetone at a temperature of 60° C. for one hour. At this time, 300 parts of methanol were added to produce turbidity, and the resulting mixture was poured slowly, with stirring, into 1600 parts of methanol. The white voluminous precipitate thus formed was filtered and dried, and was soluble in acetone and chloroform. Upon heating, the polymer softened at 80-85° C. and then became infusible and insoluble with further heating.

It is also possible to produce the fusible polymer in accordance with my invention without resorting to the use of solutions of the monomer. Thus, the monomer may be polymerized directly by use of heat and/or light, preferably in the presence of catalysts such as air, ozone, oxygen, peroxides and the like and interrupting the polymerization at the proper time. Since the polymerization proceeds without undue rapidity with many of these materials, the reaction may be stopped before the gel state is reached without difficulty either by use of inhibitors or by cooling as hereinbefore mentioned.

The fusible polymer so produced may be molded to any desired shape and subsequently cured to the infusible state. However, it is found that if considerable monomer is retained by the polymer, upon curing, considerable difficulty is encountered in securing complete or substantially complete polymerization of the residual monomer. This may be undesirable.

Accordingly, we have found that it is desirable to remove all or a portion of the monomer prior to curing the polymer to its infusible state. In accordance with one convenient method, the monomer may be distilled from the polymer by heating at a low temperature or by placing the fusible polymer under a vacuum or by extracting the monomer with a solvent in which the polymer is insoluble such as methyl or ethyl alcohol. Additionally, the polymer and monomer may be separated by dissolving the product in a solvent for both monomer and polymers and adding a nonsolvent to precipitate the fusible polymer.

The following example is illustrative of this phase of our invention:

Example IV

A quantity of monomeric ethylene glycol dicrotonate was heated with 3 percent by weight of benzoyl peroxide at 150° C. until the solution became viscous. The liquid was then cooled to room temperature introduced into an equal portion of acetone and the fusible polymer was precipitated with methyl alcohol as in Example I. This polymer was fused by heating to a temperature of 100° C. in a mold and was further cured at a pressure of 1500 pounds per square inch and a temperature of 150° C. for one hour. The article produced was hard, insoluble, clear, transparent, and free from fractures.

Example V 150 parts by weight of cinnamic acid, 30 parts by weight of ethylene glycol, one part by weight of p-toluenesulphonic acid and 0.5 part by weight of hydroquinone were heated under a reflux condenser for 15 hours. The mixture was then washed with water and the glycol dicinnamate produced was distilled. One part by weight of glycol dicinnamate was heated with three percent by weight of benzoyl peroxide at a temperature of 185° C. for a period of seven hours. The mixture was then dissolved in phenyl cellosolve acetate and treated with methyl alcohol to precipitate a fusible polymer. This polymer fused at 190° C. When a quantity thereof was placed in a mold and heated to a temperature of 200° C. at a pressure of 2000 pounds per square inch for a period of 15 hours, a hard transparent, infusible sheet was obtained.

Example VI 650 parts by weight of cinnamyl chloride was heated with 90 parts by weight of glycerol and 400 parts by weight of quinoline to a temperature of 50° C. for 12 hours. The mixture was then washed with water and then 0.1 N sodium hydroxide solution and was then distilled at an absolute pressure of 4 mm. of mercury. The molecular weight of the distillate was approximately that of glycerol tricinnamate. A quantity of this material was heated with 3 percent by weight of benzoyl peroxide at a temperature of 190° C. for 5 hours after which the solution was mixed with acetone and the fusible polymer recovered by means of methyl alcohol as in Example I. This polymer was soluble in dioxane, acetone and phenyl cellosolve acetate. When a quantity was placed in a mold and heated to 200° C. at a pressure of 2000 pounds per square inch, a transparent insoluble sheet was secured.

The method of preparing the fusible polymer by direct polymerization of the monomer is partially adapted to the treatment of those materials which polymerize without undue rapidity such as unsaturated crotonates or glycol dicrotonate or similar polycrotonate or the corresponding itaconates, etc. In the case of materials which polymerize with greater rapidity, such as the acrylates, methacrylates, or chloracrylates, recovery of substantial yields of the fusible material by direct polymerization is exceedingly difficult and only minor yields are generally obtained. Accordingly, it is preferred to treat such polymers in the presence of a solvent for the polymer as previously described.

The fusible polymers so produced have many characteristics which are similar to those of the polymers formed from the saturated acrylic acid esters. They are soluble in such organic solvents as acetone, dioxane, chloroform, ethyl cellosolve acetate, triacetin, phenyl cellosolve, etc., and soften or flow upon heating. They are precipitated from solutions by use of nonsolvents as white amorphous powder. The exact softening points of the products are dependent to a great degree upon the temperature, catalyst concentration and monomer concentration of the solution undergoing polymerization. In general, it is found that the chloro derivatives, such as the chloracrylic or chlorocrotonate esters soften at a temperature somewhat higher than the corresponding acrylic and methacrylic esters and at normal temperatures are somewhat harder and more dense. All of these products appear to be easily molded into convenient shapes.

The time required for polymerization to the fusible state is dependent upon the nature of the material, the catalyst concentration and the temperature of polymerization. In the case of the acrylate esters polymerization in solution for a period of 4 hours is found to be satisfactory when the temperature is 60° C. This period must be materially shortened with rising temperature and at 100° C., it is found that the fusible polymer must be recovered within a few minues after the polymerization reaction is initiated. Similar variations of time of polymerization in accordance with the temperature is found necessary in treating other polymerizable materials. In any case, however, the polymer should be recovered by interrupting polymerization as the monomer undergoing treatment grows viscous since after solidification thereof, the polymer is found to be substantially insoluble.

In accordance with our invention, we have found that upon subjection of these polymers to heating at temperatures somewhat above the softening point thereof, for a sufficient period of time, they are converted into infusible, insoluble, transparent, hard and wear-resistant products. Thus, while the fusible polymer melts or flows when heated under atmospheric pressure and nonpolymerizing conditions the infusible polymer retains its contour or shape and does not flow under such conditions and in general, cannot be molded. This conversion appears to occur in the absence of catalysts. It may be assisted, however, by the incorporation of usual polymerization catalysts, such as oxygen, ozone, air, peroxides, such as hydrogen peroxide, or benzoyl peroxide, basic or acidic catalysts, light, etc. By use of catalysts, it is found that the conversion of these products to the infusible state may be secured at lower temperatures. The application of super-atmospheric pressure has been found to assist the transformation to the insoluble and infusible stage. The conversion of the polymers of these esters appears to be more rapid than conversion of fusible polymers of unsaturated esters of the corresponding acids. Thus, glycol dimethacrylate converts more rapidly than allyl methacrylate.

The properties of the products so produced are dependent to a degree upon the conditions under which they were rendered infusible. Thus, extremely hard, somewhat brittle products may be prepared by effecting the treatment at relatively high temperatures or under high pressures. On the other hand, somewhat stronger, less brittle materials may be secured when the treatment is conducted under moderate pressures and temperatures sufficiently low to permit a slow conversion of the fusible polymer into its infusible stage through a period in which it is substantially completely molten.

By operation, in accordance with the present invention, it is thus possible to form a molded article from the fusible polymer such as the fusible polymeric glycol or glycerol polymethacrylates or polychloracrylates or other products previously referred to, and therefore to render the molded product insoluble and infusible by heat. In this manner, we are able to prepare transparent, hard, infusible molded products which have many of the desirable properties of the conventionally known thermoplastic resins as well. By proper regulation of the pressure and temperature, the fusible polymer may be extruded under such conditions that it becomes infusible as it leaves the extrusion die.

A large number of inert substances may be incorporated with the fusible polymer before subjecting the molding condition. Suitable for such purposes are: fillers, such as wood-flour, mica, cotton flock, etc., plasticizers, such as dibutyl phthalate, dicyclohexyl phthalate, triacetin, tricresyl phosphate, natural and synthetic resins, pigments, including titanium dioxide, carbon black, chromic oxide, lead chromate, etc., and organic dyestuffs, such as methylene blue, methyl orange, etc.

If desired, similar products may be made from suitable copolymers of the olefinic esters of the acrylic or alpha-substituted acrylic acids, with the saturated esters of these acids, such as the methyl and the ethyl esters thereof. In some cases, it is found that infusible products which are stronger and less brittle than the single polymer may be produced in this manner. This is particularly true when these materials are polymerized with a monohydric alcohol acrylate or alpha-substituted acrylate such as the methyl or ethyl ester of methacrylic or chloracrylic acid.

The polymers which we have prepared are capable of numerous uses such as in lacquers, or other coating compositions, molded articles, safety glass, etc. Where the composition is used for coating, it may be applied in solution or in solid form, either alone or in combination with natural or synthetic drying oils, or resins and the like; the solvent removed and the coated article baked to render the surface infusible. In this manner, it is possible to surface other polymers which are less resistant to the action of solvents or of heat. When a coating of the fusible polymer of the polyhydric alcohol polyester of acrylic or alpha-substituted acrylic acids, such as glycol or glycerol methacrylate is deposited upon polymerized methyl methacrylate or similar polymer and the solvent removed, a coherent surface thereof is formed. Upon heating the coated article to suitable temperatures, this surface may be made transparent, hard and infusible.

Being of the thermosetting type, these resins do not exhibit the phenomenon of "cold flow," and are thus especially desirable for such uses as airplane windshields, where the pressure differences have been found to bow thermoplastic glass substitutes, particularly at the higher altitudes. Coatings may be applied to metal, glass, wood, synthetic resin, etc., surfaces by extrusion of the heated fusible polymer directly on the suitably prepared surface. In similar manner, the surface may be heated and the polymer applied in powdered form, whereupon fusion occurs first to give a smooth, homogeneous film which may then be heat-hardened.

These resins are also suitable for many uses in the field of laminated products. For example, products of great strength, elasticity and adherence may be secured by converting fusible glycol, or glycerol polymethacrylate, polychloracrylate, polycrotonate, polycinnamate, etc., into the infusible state in the presence of a substantial amount of a compatible softening agent such as dibutyl phthalate, tricresyl phosphate, etc.

It has been found that these products are applicable for impregnation purposes. Thus, leather, paper, wood or other comparatively porous substances may be steeped in a solution of the fusible polymer of glycerol dimethacrylate, for example, or a molten body thereof, and then heated alone, under pressure, or in the presence of catalysts to convert the absorbed polymer to the insoluble, infusible form. Greatly improved products, particularly in regard to strength, water-proofing, and electrical properties are obtained.

The following examples illustrate the conversion of the fusible resin into the infusible form:

Example VII

Two parts of fusible ethylene glycol dimethacrylate polymer, prepared in accordance with Example I, was heated at 150° C., under a pressure of 5000 lbs. per sq. in. for one-half hour and a clear infusible insoluble sheet was produced.

Example VIII

Two parts of fusible ethylene glycol dichloracrylate polymer, prepared as in Example II, was molded as in Example I, at 140° C., under pressure of 2000 lbs. per sq. in. for one hour. The product obtained was hard, clear and unaffected by solvents or heat to the point of pyrolytic decomposition.

Example IX

Two parts of the thermoplastic form of ethylene glycol diacrylate polymer was heated in a mold at 140° C., under a pressure of 3000 lbs. per sq. in, for one hour. The resulting product was hard, clear and unaffected by solvents or heat to the point of pyrolytic decomposition.

The process may also be extended to the production of mixed polymers or copolymers. Thus, the fusible polymer prepared in accordance with our invention may be mixed with other monomers or polymers such as the monomer or polymer of methyl methacrylate, methyl chloracrylate, vinyl acetate, vinyl chloride, styrene, etc., and the mixture subjected to conditions of polymerization. When the term "polycinnamate, polyester, etc.," is employed in the specification or in the claims, it refers to the number of acid groups attached to the designated alcohol, in contradistinction to a polymerized ester.

Although the present invention has been described with reference to the specific details of certain embodiments thereof, it is not intended that such details shall be regarded as limitations upon the scope of this invention except insofar as included in the accompanying claims.

We claim:

1. A method of preparing a polymer which comprises polymerizing an ester of a polyhydric alcohol having at least two hydroxy groups esterified with unsaturated monocarboxylic acid, interrupting the polymerization after substantial polymerization has occurred but before the polymer is converted into an infusible gel, separating the unpolymerized monomer substantially completely from polymer before the polymer is converted to the infusible state and continuing the polymerization until the polymer has been converted into an infusible state.

2. In a method of preparing a substantially infusible insoluble polymer the steps which comprise polymerizing an ester of a polyhydric alcohol having at least two hydroxy groups esterified with unsaturated monocarboxylic acid, interrupting the polymerization after substantial polymerization has occurred but before the polymer has been converted into a gel, substantially completely separating the residual monomer from the resulting fusible polymer before the polymer is polymerized to the infusible state, subjecting the resulting polymer to a temperature and pressure sufficient to insure the existence of the polymer in a fused state, and continuing the polymerization of the fused polymer for a time sufficient to convert the polymer into a substantially infusible and insoluble state.

3. The method of claim 2 in which the ester is a polycinnamate.

4. The method of claim 2 in which the ester is glycerol polycinnamate.

5. The method of claim 2 in which the ester is ethylene glycol dicinnamate.

6. The method of claim 2 in which the ester is an ester of ethylene glycol.

IRVING E. MUSKAT.
FRANKLIN STRAIN.
MAXWELL A. POLLACK.